CERAMIC SHELL MOLDS AND METHODS OF PRODUCTION

Original Filed Jan. 31, 1964

INVENTORS.
CLAUDE H. WATTS
ROBERT A. HORTON
BY Watts & Fisher
ATTORNEYS.

United States Patent Office

Re. 26,495
Reissued Dec. 3, 1968

26,495

CERAMIC SHELL MOLDS AND METHODS OF PRODUCTION

Claude H. Watts, Lyndhurst, and Robert A. Horton, Chesterland, Ohio, assignors to Precision Metalsmiths, Inc.

Original No. 3,249,972, dated May 10, 1966, Ser. No. 341,498, Jan. 31, 1964. Application for reissue June 15, 1966, Ser. No. 562,974

23 Claims. (Cl. 164—26)

Matter enclosed in heavy brackets [ ] appears in the original patent but forms no part of this reissue specification; matter printed in italics indicates the additions made by reissue.

*ABSTRACT OF THE DISCLOSURE*

*In the art of investment casting, a refractory mold and process of making the same characterized by the formation of a mold body around a set-up which is then removed to provide a passage defined by an inner surface of the mold body and pattern cavities gated into the passage, the passage being adapted to receive a core having portions spaced from the inner surface of the mold body to define a sprue passageway communicating with the pattern cavities.*

This invention relates generally to the art of investment casting, and more specifically to ceramic shell molding techniques of precision casting wherein shell molds suitable for casting metal are prepared by building up layers of refractory material around disposable patterns which are subsequently removed from the molds and the molds prepared for casting.

As is known to those familiar with the art of investment casting, there is a growing trend in the industry to use ceramic shell molds in place of the conventional, bulk investment molds. This development of ceramic shell molding techniques has been prompted by the advantages which shell molds offer in many applications. For example, as compared with conventional bulk investment molds, shell molds are lighter and easier to handle, exhibit increased permeability and thermal shock resistance, provide for easier knock-out ad clean-up after casting, do not require flasks, and generally provide greater flexibility in processing.

In general, ceramic shell molds are prepared using patterns which are replicas of the parts to be cast, including the necessary gates and risers, and which are formed of an expendable material, such as wax or suitable synthetic resin. These patterns are attached to a sprue to constitute what is commonly known as a "set-up" or "tree." The formation of a shell mold around the pattern assembly is accomplished by dipping the tree into a refractory slurry of controlled viscosity followed by directional draining to coat the patterns completely. After draining excess slurry from the tree, the slurry coating is then sanded or stuccoed while wet with coarser refractory particles, as by dipping the tree into an air-fluidized bed of suitable refractory material. The stuccoing operation also can be accomplished by using a suitable screen to sieve on the coarse refractory particles. The result is a coat of ceramic material having refractory particles embedded in the surface. This coat is hardened, usually by air drying at room conditions.

After the first coat is sufficiently hard and dry, the steps of dipping, draining, stuccoing, and drying are repeated until a refractory shell having a sufficient thickness to resist the stresses occurring in subsequent operations has been built up around the tree. The usual shell thickness is from about ⅛ inch to about ½ inch, although thicker or thinner shells may be formed for special situations. The disposable patterns are then removed from the shell mold and the mold prepared for the casting operation.

The present invention provides substantial improvements in all phases of ceramic shell molding operations. In general, the operations can be carried out more economically, quicker, and with fewer handling problems than in the past. As will hereinafter become apparent, these improvements facilitate production line procedures and the use of automatic equipment, as distinguished from the manually performed operations currently employed.

In addition to the general advantages described above, the invention affords distinct improvements in the ceramic shell molds themselves. It is possible to cast more parts in each individual shell mold than in the ceramic shell molds heretofore produced by conventional methods. Further, the molds can be more satisfactorily formed in accordance with the invention so as to reduce substantially the number of scrap castings processed from defective molds. The new molds are also less expensive than molds formed by prior art techniques and are easier to handle and inspect.

With specific regard to the formation of the set-up or tree, one practice is to injection mold or extrude the sprue from an expendable material which is usually wax. The sprue is customarily cylindrical in shape and is formed either as a solid, massive piece, or more advantageously, as a hollow cylinder in accordance with the invention of U.S. Patent No. 3,015,138. According to another technique, the sprue may be formed by coating a metal center tree with a low melting point wax.

In either case, the sprue is placed on end and the wax is softened on the surface of the sprue at selected locations, as by use of a wax welding tool. When the wax has been softened, a pattern is pressed tightly against the sprue to embed the gate of the pattern into the wax. These operations are manually repeated until the desired number of patterns have been attached in rows along the length of the sprue. The sprue is then usually provided with a handle at one end so that the set-up can be manipulated during the subsequent shell making operations.

Since several thousand patterns may be attached to a single large sprue, the conventional practice of manually holding the sprue vertically on end and rotating it after each row of patterns has been attached is both tedious and time-consuming. Further, the location of the patterns on the sprue is critical, since a shell mold cannot be properly formed around patterns which are too close together. When the tree is formed by conventional methods, it is frequently difficult properly to locate the patterns. Another problem has been that the handle which is attached to the set-up by means of a threaded insert embedded in the wax often pulls loose during handling of a set-up, particularly as the size and weight are increased, as in the dipping and stuccoing operations.

The present invention overcomes the foregoing problems heretofore associated with the formation of the set-up or tree. In overcoming these problems, the invention contemplates a novel jig which is secured within a hollow, generally cylindrical sprue prior to attaching the patterns. In its preferred form, the jig includes end plates which close the ends of the sprue and a rod which extends along the sprue axis beyond the plates. The rod is provided with an external handle so that the sprue can be conveniently rotated about a horizontal axis. When attaching the patterns, the jig and sprue are rotatably mounted in a horizontal position so that the operator can affix the patterns more conveniently than when the sprue is held on end. After the patterns have been attached to complete the set-up, the jig, including the handle, are retained in connection with the sprue to facilitate subsequent operations.

When dip-coating a set-up or tree in the refractory slurry, the conventional practice is for an operator to hold the set-up vertically by the attached handle and dip it into a deep slurry tank containing a sufficient amount of slurry completely to cover the set-up. The set-up is then lifted from the tank and directionally drained by manually turning it in various positions in an effort to cause the excess slurry to flow into all of the pattern cavities and obtain uniform coverage. When performing this operation, the operator is required visually to inspect the set-up to see if all the patterns have been satisfactorily coated. If the patterns are not satisfactorily coated, the set-up must be again immersed in the slurry tank before being stuccoed with the granular refractory material.

Because the set-ups have been handled manually, it has been difficult to obtain consistently satisfactory results when applying the refractory slurry. In particular, the set-ups are heavy and difficult to manipulate because of the weight of the wet slurry. Concomitantly, the heavy, slurry-coated set-ups cannot be easily turned so to obtain uniform pattern coverage. Although the set-ups are visually inspected to determine if they are properly covered, it is not infrequent for improperly coated parts to be overlooked, this being particularly true when several thousand relatively closely spaced patterns are involved in a single set-up. The conventional handling of the set-ups during the dip-coating operations is also time-consuming and is not adapted to economical production operations. The problems of handling and properly coating the patterns to form a satisfactory mold shell obviously are increased with the number of patterns attached to a single sprue.

The use of deep slurry tanks in which the set-ups are conventionally dipped also presents serious problems. For example, it is difficult to maintain the refractory powder in suspension in a deep slurry bath. The conventional practice of dipping the set-ups vertically necessitated relatively deep slurry baths to cover the larger size set-ups and, hence, difficulties were involved in processing such set-ups prior to the present invention.

Similar problems are involved in the conventional stuccoing operation in which the slurry coated set-ups are dipped while wet into an air-fluidized bed of refractory material. As in the case of the slurry bath, the bed of refractory material must be deep enough completely to cover the set-up. When relatively deep beds of refractory material are provided because of the size of the set-ups being processed, a bubbling action tends to occur due to air pockets in the fluidized bed. This bubbling action will frequently knock off small patterns from the set-up. Another problem has been that the wet slurry drips from the set-ups into the refractory bed to form chunks of refractory material. These chunks must be removed from the bed in order that the set-ups can be properly stuccoed. Further, it is difficult to clean the deep containers which hold the granular refractory material.

This invention also eliminates the foregoing problems heretofore involved both in dip-coating and stuccoing the pattern set-ups. In general, this is accomplished by supporting and rotating the set-ups on a horizontal axis in a manner similar to that described above in connection with the formation of the set-ups. When applying the refractory slurry in accordance with the preferred technique contemplated by this invention, a set-up is supported horizontally so that the rows of patterns can be moved into and out of the slurry bath by rotating the set-up. The entire set-up is not required to be immersed at one time in the slurry as has been done in the past and the depth of the slurry need only be sufficient to cover a few rows of patterns of the horizontally disposed set-up. By making it possible to use a shallow slurry bath instead of the conventional deep dipping tank, the problem of keeping the refractory powder in suspension has been effectively overcome and larger set-ups can be processed than heretofore possible.

The rotation of the set-up on a horizontal axis has also been found to produce better coating results. As the set-up is rotated to move the rows of patterns into and out of the slurry, the angular positions of the patterns are continuously changed. As a result, the slurry can run over all portions of a pattern and fill all of the pattern cavities so as to produce a uniform coating. It will also be seen that the operator is not required to hold the set-up during the dipping and directional draining operations. Thus, in addition to the improved coating results which are obtained, the operations can be carried out more quickly and efficiently than heretofore possible.

In accordance with this invention, the slurry coated set-ups or trees are horizontally supported and rotated during the stuccoing operation. Thus, as in the case of dip-coating, only a relatively shallow bed of refractory material is required. Less air is required to fluidize the shallow beds than the deep beds heretofore used. The problem of air pockets occurring in the refractory bed is eliminated, and the shallow containers which are used can be easily cleaned.

As generally noted above, substantial improvements are obtained in the construction of the shell mold itself. One of these improvements will be evident from the novel process described above and constitutes the more consistently satisfactory results which are obtained in the formation of a uniform refractory coating around the patterns. Another improvement of the mold comprising this invention is particularly apparent when the patterns are closely spaced on the sprue. With the prior art techniques, a substantial amount of slurry is retained between the closely spaced patterns to form relatively thick wall portions in these areas. The thick wall portions are difficult to dry properly and frequently crack when the molds are heated, as during the pattern removal operations and/or when the molds are fired prior to casting. Because of the novel mold forming operations described above, and particularly the manner of applying the refractory slurry, the shell molds of this invention are characterized by a substantially uniform thickness even when the set-up involves many closely spaced patterns. Consequently, the problems of drying and cracking are eliminated. Further, it is possible to provide an increased number of patterns on a single sprue.

Other problems associated with conventional ceramic shell molding techniques occur during the pattern removal operations. Depending upon the type of pattern material, different pattern removal steps are employed for disposing of the pattern after formation of the refractory shell molds. However, regardless of the particular technique, it has been difficult to remove the pattern material without cracking the relatively thin walls of the molds.

When using wax patterns and certain recently developed pattern material blends, a procedure known as "flash dewaxing" is conventionally employed. According to this procedure, the shell molds are placed directly into a furnace operating in the range of from about 1600° F. to about 2000° F. The high temperature results in a surface layer of the pattern material melting and the molten surface material of the patterns either flows out of the mold or soaks into the shell.

The space provided in each mold cavity by melting of the surface layer of pattern material may be sufficient to accommodate the bulk of pattern material so that it will not expand and crack the mold. However, in some instances cracking still occurs. In order to avoid cracking, shell molds are frequently provided with wax relief holes which must be patched prior to casting. Another expedient is to attach "whiskers," such as ordinary hair brush bristles, to the patterns prior to forming the shell. These whiskers are destroyed by the heat to provide relief vents in the mold during the pattern removal operation.

When the patterns are formed of synthetic resin, flash de-waxing techniques cannot be employed successfully, since the synthetic resins soften very gradually without significantly melting at the mold interface. The only known pattern removal technique which permits the use of conventional plastic patterns and ceramic shell molds involves at least partially dissolving the patterns by the application of a suitable solvent. Usually the solvent is applied at room temperature by soaking the molds in a solvent bath. Although this solvent soaking technique is currently employed on a commercial scale, it has been found that in certain situations the softening plastic tends to develop detrimental fluid pressures in the individual pattern cavities. In these situations, the combined pressures in a large number of cavities has actually caused the entire side wall of a shell to break away and thus destroy the tree assembly.

The present invention significantly reduces the problem of mold cracking during pattern removal operations. As will hereinafter be made apparent, the improved shell mold constructions which are provided can be heated both internally and externally to effect removal of heat expendable pattern material. The internal heating of the molds affords almost instantaneous relief on the inside of the molds for each pattern cavity. This alleviates wax and gas pressures in the cavities which would otherwise crack the shell mold. Further the invention eliminates the need for expedients such as wax relief holes and subsequent patching operations which are necessary. The tendency toward cracking is further reduced because of the thinner walls which are formed according to the invention. Concomitantly, the conventional patch dip which is frequently required in conventional operations after the pattern removal operations to repair cracks is usually not required with the processes and molds of this invention. Still another advantage is that the molds can be de-waxed in a shorter time than in the past.

The improved molds of this invention also facilitate removal of plastic patterns by solvent soaking More particularly, the construction is such that access is provided into the center of the mold so that the liquid solvent can be applied to the root or gate ends of the patterns adjacent the sprue. By dissolving the patterns progressively from their root ends within the mold, the dissolved pattern material is free to drain from the pattern cavities without building up detrimental fluid pressures.

Still another feature and advantage of this invention is the formation of a ceramic shell mold which is characterized by a tubular sprue passage defined by closely spaced surfaces of the mold. The advantages of the tubular sprue are described in U.S. Patent No. 3,015,138. In general, a tubular sprue, as distinguished from the more conventional solid, massive sprue, obtains an exceptionally low ratio of gating metal to casting metal; that is to say, a relatively small amount of metal is required in the sprue passage as compared to the amount of metal in the workpiece castings themselves. Another very significant advantage constitutes the improved metallurgical characteristics of the castings which are produced, including lower thermal gradients throughout the entire casting system, more uniform hardness values, reduced susceptibility of the cast parts to hot tearing; and general casting soundness. Another advantage is that a high ratio of gating area in square inches is obtained in relation to the volume of the sprue in cubic inches; that is to say, there is a relatively large amount of surface area available for gating many castings in relation to the minimum volume of metal required in the sprue passage to feed the castings.

In accordance with the present invention, a generally cylindrical member is provided as the sprue pattern and the workpiece patterns are attached to the cylinder in the manner described above. After the shell has been formed and the patterns removed, the shell is placed in an upright position and a ceramic core is disposed within the shell in spaced relation to its inner wall surface. The inner surface of the shell and the closely spaced outer surface of the core cooperate to define a narrow tubular sprue passage into which the metal is cast. The core and the shell are secured together in this position as an integral mold assembly and one end of the narrow sprue passage is closed to prevent leakage of molten metal. In this manner, all of the advantages of a mold having a tubular sprue are obtained.

Since the core is not inserted into the shell until after the pattern removal operation, the shell can be readily heated internally as well as externally to effectuate the improvements in the pattern removal operations described above. Thus, in addition to the inherent advantages of tubular sprues, the mold construction and techniques provided by this invention facilitate improved pattern removal steps which reduce the occurrence of mold cracking.

Accordingly, a general object of this invention is to provide improvements in ceramic shell molding techniques of precision casting.

A more specific object of the invention is to provide apparatus and methods which facilitate formation of a set-up or tree in an improved manner.

Another object of the invention is to provide improvements in the dip-coating and stuccoing operations of ceramic shell molding techniques.

Still another object of the invention is to provide improvements in the manner of removing patterns from ceramic shell molds.

A further object of the invention is to provide improved ceramic shell molds which may include tubular sprue passages and which are characterized by uniform wall thicknesses.

Another object of the invention is to provide ceramic shell molds and mold forming techniques which make it possible to cast more parts in a single mold then heretofore possible.

Still another object of the invention is to provide improvements in ceramic shell molding techniques which are characterized by the advantages described above and, in addition, are more economical, quicker, and easier to carry out than in the past.

Other objects and advantages of the invention will become apparent from the following detailed description when taken in conjunction with the accompanying drawing.

Figure 1:
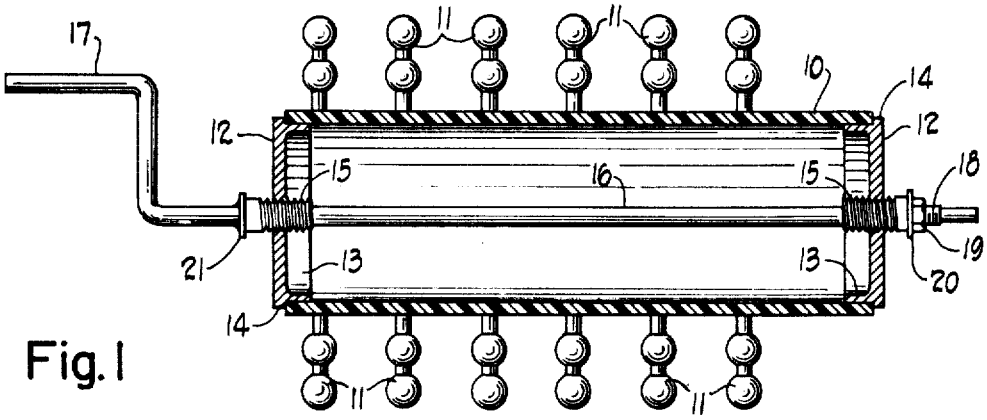
FIGURE 1 is a schematic, vertical cross-sectional view illustrating the improved apparatus and technique for forming a set-up in accordance with one aspect of this invention.

Referring now to the drawing, and to FIG. 1 in particular, there is shown a sprue 10 which is in the form of a hollow, open-ended cylinder. As noted above, the sprue 10 may be formed by injection molding or extruding an expendable material, such as wax or synthetic resin. The hollow, open-ended sprue 10 also may be formed of relatively stiff materials, such as cardboard, metal or the like, and coated with a thin external layer of wax or other suitable heat-disposable material. A plurality of patterns 11 are shown attached to the outside of the member 10 to form a set-up or tree. The patterns 11 are formed of an expendable material, such as wax or synthetic resin. The patterns 11 are replicas of the parts to be cast and include the necessary gates and risers.

In accordance with this invention a plate 12 is initially provided over each end of the sprue 10. Each of the plates 12 is shown to include a rim 13 which engages the inside surface of the sprue 10 and a lip 14 which partially extends across the wall of the sprue. The plates 12 are preferably metal and are provided with a thin coating of wax (not shown) so that they can be readily separated from the subsequently formed shell mold. Alternatively, the end plates 12 may be formed of plastic, cardboard, or the like, and attached to the sprue 10 by mechanical means or by sticky tapes or by any other suitable fastening expedient.

In the preferred construction, each of the plates 12 is also provided with a sleeve 15. As shown, the sleeves 15 are threaded into centrally formed holes in the plates. A rod 16 extends through the sprue 10 along its axis and through the sleeves 15 in the end plates 12. In the preferred arrangement, one end of the rod 16 is provided with a handle 17. The opposite end portion of the rod 16 is provided with a threaded portion 18. A nut 19 and thrust washer 20 are mounted on the threaded end portion 18 in engagement with the outside end of the adjacent sleeve 15. The portion of the rod 16 adjacent the handle 17 is shown provided with a fixed collar 21 which engages the outside end of the adjacent sleeve 15.

The preferred construction including the sprue 10 and the jig comprised of members 12, 15 and 16 is assembled by inserting the wax-coated end plates 12 into the open ends of the sprue 10 and threading the sleeve 15 into the end plates. The rod 16 is then inserted through the sprue until the collar 21 engages one of the sleeves 15. The nut 19 is threaded onto the rod portion 18 so that a controlled clamping pressure is exerted by the end plates 12 on the sprue 10. In this way, the sprue 10 is firmly held in position and the handle portion 17 for manipulating the assembly is prevented from being accidentally pulled away from the sprue, as frequently occurs with the handles attached to conventional set-ups.

The described jig facilitates attachment of the patterns 11 to the sprue 10. To this end, the sprue 10 is adapted to be disposed horizontally with the outwardly extending end portions of the rod 16 rotatably supported, as by plates having V-shaped notches or the like. Suitable supporting plates for this purpose are shown at 26 in FIG. 2. Thus supported, the patterns 11 can be easily and accurately attached in rows along the length of the sprue 10.

The jig comprising the end plates 12, the sleeves 15, and the rod 16 also facilitates handling of the set-up after the patterns have been attached. For example, it is contemplated by this invention that the set-ups can be supported in racks by the handle portion 17 of the rod 16 for transportation from the set-up room to the mold making or shelling room.

Figure 2:
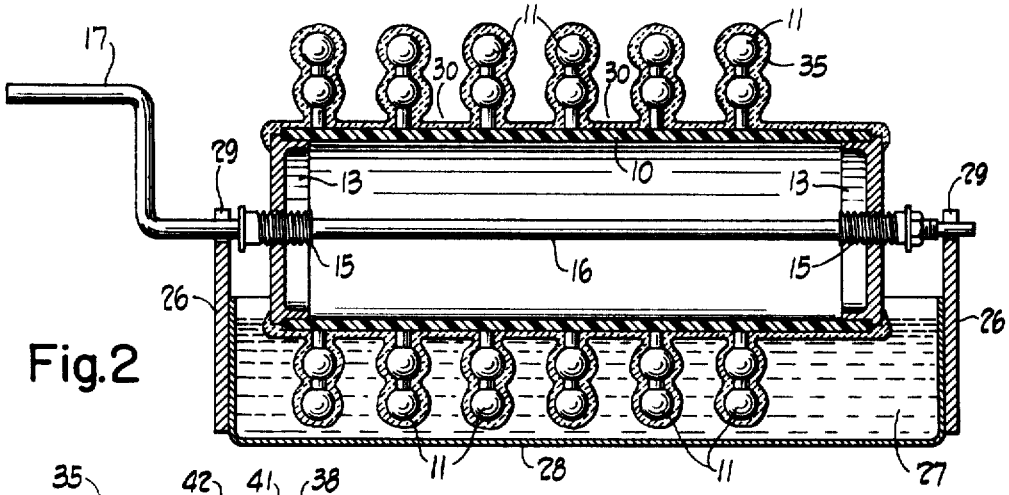
FIGURE 2 is a schematic vertical cross-sectional view illustrating the improved manner of coating the pattern set-up in accordance with this invention.

FIGURE 2 illustrates the preferred manner of coating the set-up with a refractory slurry in accordance with this invention. As shown, a shallow bath of slurry 27 is provided in a container 28. At either end of the container 28 are the plates 26 which have V-notches 29 for rotatably supporting the end portions of the rod 16. The set-up is disposed horizontally with the end portions of the rod 16 engaged in the notches so that only the lower rows of patterns are immersed in the slurry.

In accordance with conventional practices, a preferred refractory slurry used for dipping consists essentially of a suspension of a fine refractory powder, such as zircon (zirconium silicate) and fused silica, in a binder solution comprised mainly of colloidal silica sol and small amounts of an organic film former, a wetting agent, and a defoaming agent. The refractory powder usually is minus 100 mesh.

In forming a slurry coating around the set-up, the handle 17 is revolved slowly, for example, about five r.p.m., so that the rows of patterns 11 are continuously moved into the slurry bath 27 at one side of the container 28 and out of the slurry bath 27 at the other side of the container. The set-ups can be rotated manually, if desired. It is preferred, however, to employ a motor drive (not shown) including a gear reduction unit, since in this manner the set-ups can be rotated automatically and uniformly.

It will be seen that movement of the set-up in this manner constantly changes the angular positions or attitude of the various patterns. This constant changing of the attitudes of the various patterns is advantageous, since the excess slurry is caused to run over the patterns as they are rotated out of the bath and around the axis of the sprue, thus producing uniform pattern coverage. With certain configurations of parts, such as those having intricate surface detail, small internal cavities, and shapes which tend to trap air during rotation of the set-ups, it has been found desirable to carry out the above-described procedure under a vacuum in order to assure uniform coating results. This is accomplished by placing the slurry tank with the supporting fixtures and motor drive with a vacuum chamber and subjecting the entire equipment together with the workpiece to vacuum conditions while the set-up is being rotated and coated with slurry.

In addition to the improved coverage of the patterns which is made possible by this invention, it will also be seen that the operation can be carried out using a shallow slurry bath. Since the refractory powder can be kept in suspension in the shallow bath and since manual handling of the set-up is eliminated, larger set-ups can be processed with fewer difficulties than with prior techniques. The slurry coating operation also can be carried out in a shorter time.

As generally described above, another advantage of the improved manner of coating the set-ups with refractory slurry is that the mold walls between the adjacent patterns can be made relatively thin. Heretofore, the slurry tended to fill the spaces 30 (FIG. 2) between adjacent patterns, particularly when a large number of closely adjacent patterns were assembled, so as to form a mold having relatively thick sections over the sprue pattern. The molds having thick sections were difficult to dry thoroughly so that cracking frequently resulted during the pattern removal operations. This disadvantage is substantially eliminated by the present invention because of the constantly changing positions of the patterns during the coating operation. By rotating the patterns into and out of the bath on a substantially horizontal axis excess slurry is continuously drained away from between the patterns during the slurry coating operation so that only a thin wall is produced.

In order to obtain the best results when processing shell molds according to this invention, it is desirable to drain all of the excess slurry from the set-ups after the slurry coating operation and prior to the stuccoing operation. Excess slurry is allowed to drain from the set-up by raising it out of the slurry tank and supporting it immediately above the tank on supporting fixtures (not shown) so that the excess slurry can drain back into the slurry tank. The set-up is held stationary in this position for a period of time, such as from about 15 to about 20 seconds, to permit directional draining, and the set-up is then rotated or indexed for further directional draining so as to assure uniform coverage and removal of most of the excessive slurry. This draining operation is usually advantageously followed by a spin-drain step in which the set-up is spun at a varying r.p.m. depending upon the size and configuration of the workpieces and the diameter of the sprue. The speed may, for example, vary from about 50 to about 150 r.p.m., as desired.

The stuccoing operation is carried out in substantially the same manner as that of applying the slurry coating. To this end, a shallow, air-fluidized bed of granular refractory material (not shown) is provided in a container similar to container 27. The stuccoing material is generally of much larger particle size than the refractory powder used in the slurry. Suitable refractory materials employed for stuccoing include granular zircon, fused silica, silica, various aluminum silicate grogs including mullite, sillimanite, fused alumina, tabular alumina, and similar materials. When applying the stuccoing material, the set-up is again disposed horizontally and the rod 16 rotatably supported so that only the lower rows of patterns are in the fluidized bed. The stuccoing material is applied by turning the handle 17 so that the coated patterns are moved into and out of the air-fluidized bed.

When the above-described dipping and stuccoing steps have been carried out, the slurry coating is hardened, as by forced air drying, to form a refractory layer around the tree assembly. Uniform drying of the slurry coating can be assured by supporting the set-up during the drying period in a manner such that the set-up can be periodically or continuously turned, as by means of a motor drive. This sequence of operations is repeated as many times as is necessary to build up a shell 35 having the thickness and strength required for the particular casting operation. In accordance with conventional shell molding techniques, the usual wall thickness of the shell 35 is on the order of about ⅛ of an inch to about ¼ of an inch.

Subsequently, the end plates 12 and the rod 16 are disassembled from the shell 35 prior to the pattern removal operations so that both ends of the shell are open. When the sprue 10 and patterns 11 are formed of wax or other heat expendable material, the patterns are removed in the same operation by placing the shell 35 directly into a furnace at a temperature of from about 1200° F. to about 2000° F., and preferably from about 1600° F. to about 2000° F. As explained above, a flash de-waxing effect is obtained at these temperatures whereby a surface layer of the workpiece patterns and sprue pattern melts before the bulk of the pattern material.

In instances where the sprue 10 is made of a wax coated material such as cardboard, metal, or the like, it is possible to remove the sprue prior to placing the shell 35 into the furnace for the pattern removal operation. Cardboard sprues usually can be stripped manually from the shell mold after the ends of the sprue have been opened. When the sprue is formed by a wax coated metal member, it is usually desirable to heat the metal form sufficiently to melt the thin wax coating so that the metal form can slide from the mold.

When formed according to this invention, the shell 35 can be quickly heated internally as well as externally during the pattern removal operation, since both ends of the mold are open. In a gas fired furnace, for example, flames have been observed passing completely through the mold. Consequently, almost instantaneous relief is afforded to the inside of each pattern cavity 36 (FIG. 3) so as to relieve the gas and fluid pressures which are developed by the pattern material as it decomposes. The liquified pattern material is free to drain from the gate ends 37 of the pattern cavities 36, thus opening the cavities and creating space to accommodate subsequent expansion of the bulk of pattern material as it is heated and decomposed. The result of this improved operation is a substantial decrease in the occurrence of mold cracking without the necessity for conventional expedients, such as wax relief holes or vents. Another important advantage is that heating of the mold and removal of the pattern material can be accompilshed in a shorter time than in the past.

The open end formation of the shell 35 also is advantageous when the patterns are formed of the synthetic resin and are removed by soaking the mold in a synthetic resin solvent bath. Since the ends of the mold are open, the liquid solvent can be circulated through the center of the mold to dissolve the gate or root ends of the patterns. This opens up the pattern cavities so that the dissolved plastic is free to drain without being trapped in the cavities and developing detrimental fluid pressures which could crack the mold.

Still another advantage of the open-end shell 35 which will be apparent to those skilled in the art is that the inner surface of the shell can be thoroughly inspected for defects prior to casting. Heretofore, shell molds have been formed with one closed end so that internal inspection, particularly of the areas adjacent the closed end was difficult.

Figure 3:
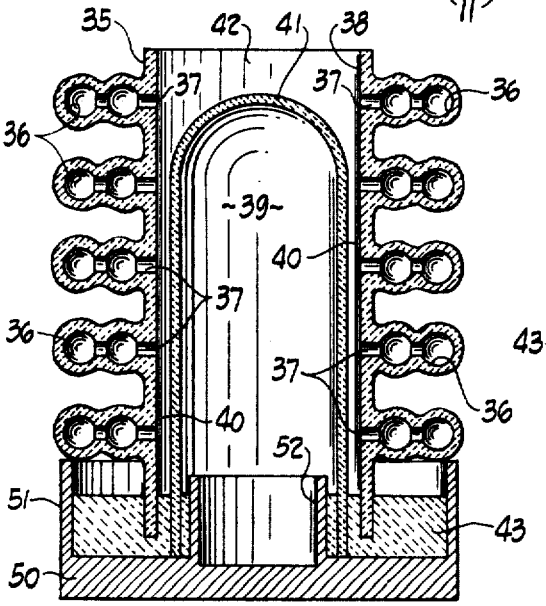
FIGURE 3 is a vertical cross-sectional view showing the assembly of the ceramic shell and internal core to define a tubular sprue passage; and, FIGURE 4 is a fragmentary elevational view of a ceramic shell mold formed in accordance with this invention.
Figure 4:
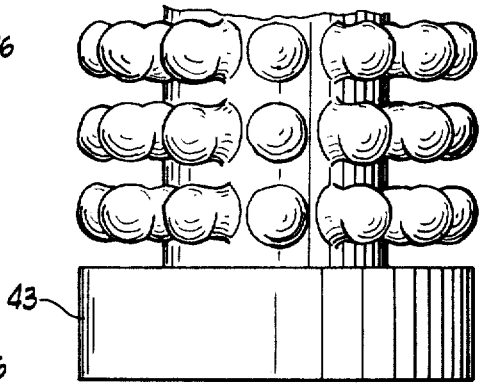

Reference is now made to FIGS. 3 and 4 which illustrate the final stage in the formation of the ceramic shell mold. As here shown, the sprue 10 has been completely removed and the pattern material destroyed to form the pattern cavities 36. The inside surface 38 of the shell 35 defines a cylindrical passage, and the gate ends 37 of the cavities 36 open through the surface 38.

In accordance with this invention, a core 39 is provided within the shell 35 and is spaced from the inner shell surface 38 to define a tubular sprue passage 40. As shown, the core 39 is a hollow member having a dome-shaped end 41. The dome-shaped end 41 is at substantially the same height as the top row of pattern cavities in the shell and cooperates with the top portion of the shell to define a pouring cup 42. The shell 35 and the core 39 are secured together as an integral mold assembly and the bottom end of the sprue passage 40 is sealed to prevent leakage of metal. In the illustrated construction, the shell 35 and the core 39 are secured together by a solid refractory base 43 which closes the end of the tubular sprue passage 40 opposite the pouring cup 42.

The core 39 is preferably made of a refractory material and may, for example, be formed by coating a disposable wax form with the same slurry used to make shell 35. Refractory cores also can be made by preparing a slurry mix and casting it into a suitable mold. Alternatively, it is contemplated that the core may be made of metal or other material and provided with a refractory outer surface.

The base 43 may be made of any suitable material which is strong enough to hold the shell and core in assembled position and which will hold the molten metal in the sprue passage 40 without leaking. One suitable base material which has been used successfully is a water-base investment material which chemically sets and which has a thermal expansion characteristic matching that of the shell material from about room temperature to about 1800° F., whereby the shell, core and base can be fired and cast without cracking or without differentially expanding which might result in metal leakage from the sprue passage. The investment slurry used to form the base 43 was of the following formula:

16 parts of a 50% water-base solution of colloidal silica sol containing 35% $SiO_2$ (source: "Nalcoag 35%," sold by Nalco Chemical Co., Chicago, Illinois)
100 parts of a mixture containing 10% cristobalite, 10% zirconite flour, 10% fused silica, 15% Calamo 50,* 46% Calamo 20/50* MgO (r.p.s. 5), 4% $NH_4H_2PO_4$, 2% $Mg(H_2PO_4)_2$.

When forming the base 43, the investment slurry may be placed in a shallow container 50 having an outer rim 51 and a concentric inner flange 52. The flange 52 is smaller in diameter than the open end of the core 39 and serves to locate the core so that it can be placed upright near the center of the container. The shell 35 is then positioned around the core. As shown in FIG. 3, the lower row of pattern cavities is disposed on the edge of the rim 51 so that the bottom end of the shell is spaced from the bottom of the container. When the shell and core have been assembled in this manner, the investment slurry is allowed to set to form the base 43 and then the container 50 is removed. Subsequently, the mold assembly is fired and cast in the usual manner.

As will be apparent from the foregoing, the construction of the shell 35 facilitates the pattern removal op-

*Calamo 50 and Calamo 20/50 are trademarks or tradenames for a refractory clay grog made by Harbison-Walker Refractories.

eration, since the shell can be quickly heated or exposed to a liquid solvent in a manner which affords almost instantaneous relief within the shell for the decomposed pattern material. At the same time, the new and improved mold assembly which includes the shell 33 and the core 39 is characterized by a tubular sprue passage and all the attendant advantages. The base 43 also adds strength to the mold shell and facilitates handling.

The processes comprising another aspect of this invention facilitate manufacture of the mold shell by quick, economical, and easily performed techniques. Further, the improved processes make it possible to cast more parts in a single mold. While the improved processes have been described in conjunction with the new ceramic mold construction, it will be apparent that the same techniques can be used to advantage in forming the usual ceramic shell molds.

Many modifications and variations of the invention will be apparent to those skilled in the art in view of the foregoing detailed description. Therefore, it is to be understood that, within the scope of the appended claims, the invention can be practiced otherwise than as specifically shown and described.

What is claimed is:

1. In a molding operation including the steps of providing a set-up having a sprue and a plurality of laterally extending patterns attached to the sprue, coating the set-up with a refractory slurry consisting essentially of a refractory powder suspended in a binder solution, stuccoing the coating with refractory particles, and drying the coating to form a refractory layer, an improved process of applying the refractory slurry comprising providing a refractory slurry bath, supporting the set-up for rotation on its horizontal axis and so that only patterns along the lower side of the set-up are immersed in the slurry bath, and rotating the set-up so that all of the patterns are continuously moved into and out of the bath and so that the attitude of the patterns is constantly changed, whereby the slurry is caused to flow over and uniformly coat the set-up.

2. In a molding operation including the steps of providing a set-up having a plurality of patterns, coating the set-up with a refractory slurry, stuccoing the coating with refractory particles, and drying the coating to form a refractory layer, an improved process of stuccoing comprising providing a gas-fluidized bed of refractory material, positioning the set-up for rotation on a generally horizontal axis so that only patterns along the lower side of the set-up are immersed in the fluidized bed, and rotating the set-up so that all of the patterns are moved into and out of the bed.

3. A process of ceramic shell molding comprising providing a plurality of disposable workpiece patterns, forming a ceramic shell mold around said patterns, said mold being formed to include an inner surface which defines a passage adjacent a portion of each of said patterns, said passage being formed to have at least one open end, introducing a pattern removal medium into said passage to destroy said patterns and form mold cavities, each of said cavities having an opening on said surface, and thereafter assembling a core in said passage in spaced relation to said surface so as to define a sprue passageway.

4. A process of ceramic shell molding comprising forming a shell mold having a through, substantially cylindrical passage and a plurality of pattern cavities with openings into said passage, positioning a core within said passage so as to define a tubular sprue passageway, and closing said sprue passageway at one end.

5. A process of ceramic shell molding comprising providing a sprue defining means, attaching a plurality of disposable workpiece patterns to said sprue defining means so as to form a set-up, forming a shell mold around said set-up, removing said sprue defining means to form an open-ended passage through said mold, placing said mold in a medium for destroying said patterns, allowing the medium to pass through said passage and destroy said patterns to form cavities gated into said passage, and assembling a core within said passage so as to form a tubular passageway.

6. A process of ceramic shell molding comprising providing sprue structure, attaching heat-destructible patterns to the outside of said sprue structure to form a set-up, forming a shell mold around said set-up, removing said sprue structure from said mold so as to form a through passage, heating said mold internally and externally to destroy said patterns, thereafter placing a core within said passage so as to define a tubular sprue passageway, and closing one end of said passageway.

7. A process of ceramic shell molding comprising providing hollow, open-ended sprue forming means, closing the ends of said sprue forming means, attaching expendible patterns to the outside of said sprue forming means to form a set-up, forming a shell mold around said set-up, opening the ends of said sprue forming means, removing said sprue forming means from said mold to form a through passage, placing said mold in a medium for destroying said patterns, thereafter placing a core within said passage so as to define a tubular sprue passageway, and closing one end of said passageway.

8. A process of ceramic shell molding comprising providing tubular sprue structure, attaching disposable patterns to said sprue structure to form a set-up, closing the ends of said sprue structure, horizontally supporting said set-up for rotation on the longitudinal axis of said sprue structure, applying a refractory coating by rotating said set-up so that said patterns are moved into and out of a slurry bath, stuccoing said coating with refractory particles by rotating said set-up so that said patterns are moved into and out of an air-fluidized bed of refractory material, drying said coating, repeating said coating, stuccoing and drying steps until a refractory shell is produced, removing said sprue structure so that the inner surface of said shell defines a through passage, exposing said shell to a medium for destroying said patterns, placing a core in said passage in spaced relation to said inner surface so as to form a tubular sprue passageway, and closing one end of said passageway.

9. A ceramic shell mold assembly having an inner surface defining a passage therein, pattern cavities gated into said passage, a core within said passage, said core being spaced from said inner surface so as to define a tubular sprue passageway, and means closing one end of said passageway so that molten metal can be cast therein.

10. The mold assembly as claimed in claim 9 including a pouring cup communicating with the end of said passageway opposite its closed end.

11. The process as claimed in claim *5* [9] wherein said sprue defining means is removed from said mold prior to the step of placing said mold in a medium to destroy said patterns.

12. The process as claimed in claim *5* [9] wherein said sprue defining means is removed from said mold and said patterns are destroyed in the same operation.

13. A mold assembly comprising a refractory shell, said shell having an inner substantially cylindrical surface defining a central passage and a plurality of pattern cavities gated into said passage, a core having a generally cylindrical sidewall, at least the outer surface of said core being formed of refractory material, said core being disposed in said passage so that said inner surface and said sidewall define a tubular sprue passageway, and a base closing one end of said sprue passageway.

14. The mold assembly as claimed in claim 13 wherein the end of said core remote from said base defines a pouring cup.

*15. In a process of investment casting, the steps comprising forming a pattern set-up including a sprue and a plurality of laterally extending workpiece patterns having gates attached to the outside of the sprue, forming a refractory mold around the outside of the set-up so as*

*to include a passage in which the sprue is disposed and eliminating the set-up from the mold by the procedure including opening opposite ends of the mold passage and allowing a pattern removal medium to pass through the passage and destroy the patterns, thereby to form pattern cavities gated into the passage.*

*16. A process as claimed in claim 15 wherein the medium for destroying the patterns is a hot gas.*

*17. A process as claimed in claim 15 including the subsequent steps of placing a core within the mold passage so as to form sprue passageway means communicating with said pattern cavities, and closing said sprue passageway means at one end of said mold so that molten metal can be cast therein.*

*18. A process as claimed in claim 15 wherein the refractory mold is formed by the steps including applying a slurry coating to the set-up, stuccoing the slurry coating with refractory particles, drying the stuccoed coating to form a refractory layer, and repeating the steps of applying the slurry coating, stuccoing and drying until a ceramic shell mold has been produced.*

*19. In combination a refractory mold body having an inner surface defining a passage therein and pattern cavities gated into said passage, a core positioned within said passage, said core having portions spaced from said inner surface so as to define a tubular sprue passageway means communicating with said cavities, and means closing said sprue passageway means at one end of said mold body so that molten metal can be cast therein.*

*20. In a process of investment casting, the steps comprising forming a set-up including sprue-defining means and workpiece patterns, forming a refractory mold around said set-up, removing said set-up from said mold to provide a passage defined by an inner surface of said mold and a plurality of pattern cavities having openings on said inner surface into said passage, said step of removing the set-up including the step of heating said mold to melt said workpiece patterns, and placing a core within said mold passage said core being spaced from said inner surface so as to define sprue passageway means extending lengthwise of said mold and communicating with the openings of said pattern cavities.*

*21. A process as claimed in claim 20 wherein said mold passage is formed to extend through said mold.*

*22. In combination a refractory mold body having an inner surface defining a through passage and pattern cavities gated on said inner surface into said passage; and a core positioned within said passage said core being spaced from said inner surface so as to define sprue passageway means extending lengthwise of said mold body and communicating with said cavities, said sprue passageway means being adapted to be closed at one end of said mold body so that molten metal can be cast into said sprue passageway means at the opposite end of said mold body.*

*23. In a process of investment casting, the steps comprising forming a refractory mold body around a set-up including a sprue and a plurality of workpiece patterns, removing said set-up from said mold body to provide a through passage defined by an inner surface of said mold body and pattern cavities having openings into said passage, and positioning the core within said passage, so that portions of said core are spaced from said inner surface to define sprue passageway means communicating with said cavities.*

References Cited

The following references, cited by the Examiner, are of record in the patented file of this patent or the original patent.

UNITED STATES PATENTS

| | | | |
|---|---|---|---|
| 2,150,510 | 3/1939 | LeJeune | 22—134 |
| 3,015,138 | 1/1962 | Watts | 22—196 |
| 3,041,689 | 7/1962 | Peras | 22—196 |
| 3,094,751 | 6/1963 | Horton | 22—196 |
| 3,171,174 | 3/1965 | Mellen et al. | 22—196 |
| 651,705 | 6/1900 | Fletcher | 164—24 |
| 1,579,743 | 4/1926 | Warlow | 164—129 |
| 2,945,273 | 7/1960 | Herzmark et al. | 164—24 X |
| 3,177,537 | 4/1965 | Horton | 164—35 |
| 3,186,041 | 6/1965 | Horton | 164—25 |
| 3,283,376 | 11/1966 | Hockin | 164—129 |

J. SPENCER OVERHOLSER, *Primary Examiner.*

E. MAR, *Assistant Examiner.*